(No Model.) 2 Sheets—Sheet 1.
B. W. FELLOWS.
STEAM STEERING APPARATUS.
No. 476,620. Patented June 7, 1892.
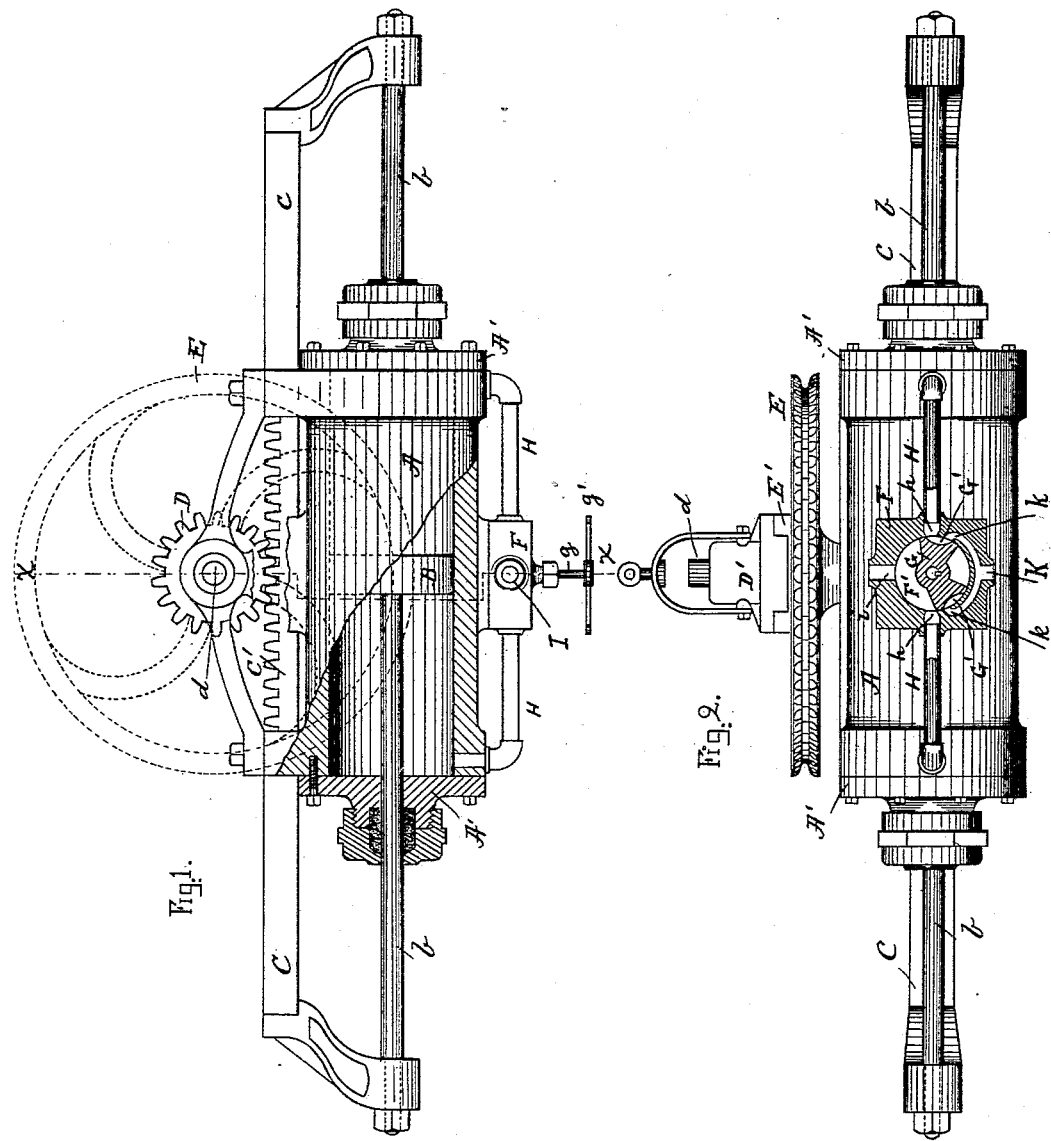
Witnesses.
Lauritz N. Möller
Alice A. Perkins
Inventor.
Byron W. Fellows
by Alban Andrén
his atty.

(No Model.) 2 Sheets—Sheet 2.

B. W. FELLOWS.
STEAM STEERING APPARATUS.

No. 476,620. Patented June 7, 1892.

Witnesses.
Lauritz N. Möller.
Alice A. Perkins.

Inventor.
Byron W. Fellows
his atty.

UNITED STATES PATENT OFFICE.

BYRON W. FELLOWS, OF BEVERLY, MASSACHUSETTS, ASSIGNOR OF ONE-HALF TO CORNELIUS MURPHY, OF SAME PLACE.

STEAM STEERING APPARATUS.

SPECIFICATION forming part of Letters Patent No. 476,620, dated June 7, 1892.

Application filed November 24, 1891. Serial No. 412,962. (No model.)

*To all whom it may concern:*

Be it known that I, BYRON W. FELLOWS, a citizen of the United States, and a resident of Beverly, in the county of Essex and State of Massachusetts, have invented new and useful Improvements in Steam Steering Apparatus, of which the following, taken in connection with the accompanying drawings, is a specification.

This invention relates to improvements in steam steering apparatus for vessels, and it is carried out as follows, reference being had to the accompanying drawings, where—

Figure 3:
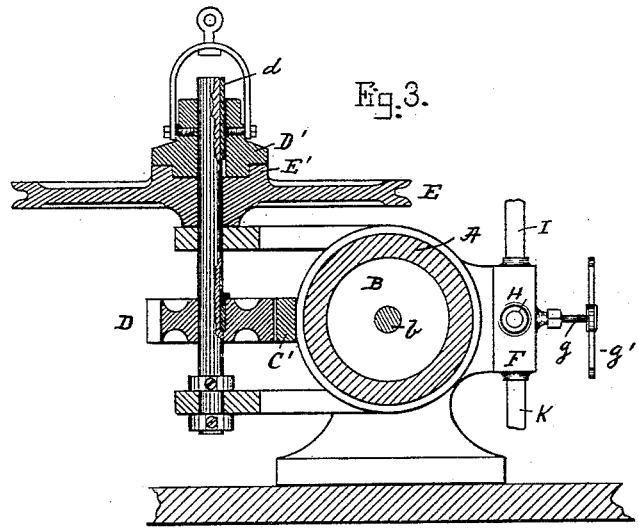
Figure 4:
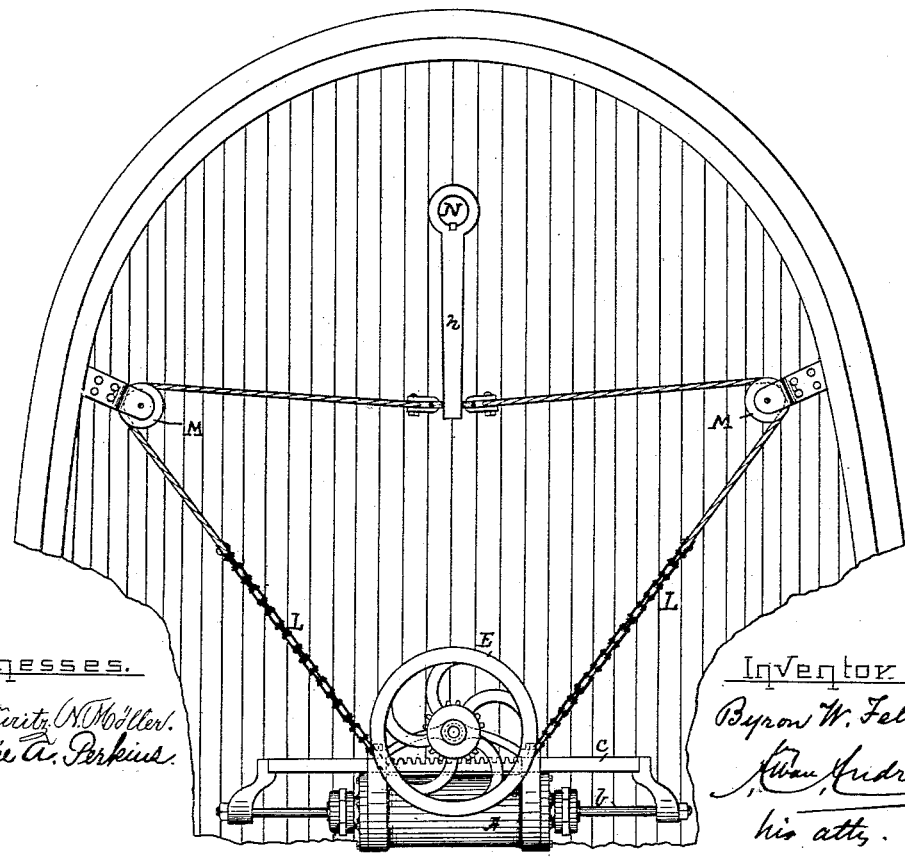

Figure 1 represents a plan view of the invention, partly shown in section. Fig. 2 represents a front elevation showing the reversing-valve in section. Fig. 3 represents a cross-section on the line X X shown in Fig. 1; and Fig. 4 represents a partial plan of a vessel, showing the connection of the steam steering apparatus to the rudder-post.

Similar letters refer to similar parts wherever they occur on the different parts of the drawings.

The improved steam steering apparatus is constructed as follows:

It consists of a steam-cylinder A, having heads A' A' at its ends, provided with the usual stuffing-boxes, through which passes the piston-rod $b$, to which is secured a piston B within the said cylinder A, as shown. To the ends of the piston-rod $b$ is secured a bar C, having a rack C', the teeth of which mesh in the teeth of the pinion D, which is secured to the shaft $d$, the latter being journaled in suitable bearings. The rack-bar C is suitably guided in bearings secured to the cylinder A or other stationary part of the device. On the shaft $d$ is loosely journaled the chain-wheel E, provided with a suitable clutch E', adapted to engage with a clutch D', which is splined on the shaft $d$ and capable of longitudinal adjustment on the latter. The object of the clutch D' is to couple the chain-wheel E to the shaft $d$ and to secure said parts together as long as the steam steering apparatus is in use. In case any accident should occur to the apparatus it is only necessary to disconnect the clutch D' from the chain-wheel clutch E', by which the chain-wheel E is made loose on its shaft, thus allowing the rudder to be worked by a hand-wheel or other means independent of the steam steering device.

In connection with the cylinder A and its piston B, I use a valve and valve-chest for the purpose of conducting the steam to and from the opposite ends of the said cylinder A, and for this purpose I have shown in Figs. 1, 2, and 3 the following device:

F is the valve-chest, having a cylindrical cavity F', in which is located upon a spindle $g$ the oscillating valve G, having at its opposite ends the recesses G' G', as shown. From the cavity F' lead ports $h\ h$ and pipes H H to the opposite ends of the steam-cylinder A, as shown.

$i$ is a port leading from the cavity F' by means of the pipe I to the source of steam-supply, and $k\ k$ are exhaust-ports connected to the exhaust-pipe K, as shown in Fig. 2.

The valve G may be actuated by means of a lever $g'$, secured to the valve-spindle $g$ and any suitable connecting mechanism to the place on the vessel where the helmsman is stationed. By turning the valve as shown in Fig. 2 the steam-pressure from pipe I will be conducted to the left-hand end of the cylinder A, causing its piston B to move toward the right, while the steam in advance of the said piston is exhausted through the pipe K, and vice versa.

The steam steering device may be connected in any suitable manner to the rudder-post, according to the construction and arrangement of the vessel in which it is to be located, and I have in Fig. 4 represented one way of making such a connection. In said Fig. 4, L is a chain (in whole or part) leading from the chain-wheel E to guide-pulleys M M and the tiller or wheel $n$, secured to the rudder-post N, as shown, and it will readily be seen that the reciprocating motion of the piston B imparts a corresponding motion to the rudder of the vessel.

Having thus fully described the nature, construction, and operation of my invention, I wish to secure by Letters Patent and claim—

1. The combination of a cylinder having a stuffing-box at each extremity, a piston in the cylinder, a valve for controlling the supply of fluid to the cylinder, a piston-rod secured to the piston and extending in reverse directions therefrom through the stuffing-boxes at the opposite ends of the cylinder, a bar arranged outside the cylinder, provided with a rack and having its extremities connected with the opposite ends of the piston-rod, a shaft provided with a chain-wheel and a pinion, which is geared with the rack, a rudder-post, and a chain connection between the rudder-post and the chain-wheel, substantially as described.

2. The herein-described steam steering apparatus, consisting, in combination, of a steam-cylinder, a piston movable therein and having a rack connected to its piston-rod, a pinion meshing in said rack and secured to a shaft provided with a clutch, a chain-wheel loose on said shaft and adapted to be connected to the said clutch, and a reversing-valve for actuating the steam-piston and its connections, substantially as and for the purpose set forth.

In testimony whereof I have signed my name to this specification, in the presence of two subscribing witnesses, on this 20th day of November, A. D. 1891.

BYRON W. FELLOWS.

Witnesses:
ALBAN ANDRÉN,
THEKLA ANDRÉN.